United States Patent [19]

Püntener et al.

[11] Patent Number: 4,996,303
[45] Date of Patent: Feb. 26, 1991

[54] PREPARATION OF 1:2 METAL COMPLEX DYES BY COUPLING IN THE PRESENCE OF A METAL DONOR IN AN INERT GAS ATMOSPHERE

[75] Inventors: Alois Püntener, Rheinfelden, Switzerland; Daniel Parisot, Saint-Genis-Laval, France

[73] Assignee: Ciba-Geigy Corporation, Ardsley, N.Y.

[21] Appl. No.: 275,240

[22] Filed: Nov. 22, 1988

[51] Int. Cl.$^5$ .................. C09B 45/01; C09B 45/16; C09B 45/20
[52] U.S. Cl. ........................... 534/602; 534/696; 534/697; 534/712; 534/722; 534/724; 534/725; 534/887
[58] Field of Search ............... 534/602, 712, 722, 724, 534/725, 696, 697

[56] References Cited

U.S. PATENT DOCUMENTS

| | | | |
|---|---|---|---|
| 1,480,640 | 1/1924 | Straub et al. | 534/602 |
| 2,906,746 | 9/1959 | Brassel et al. | 534/696 |
| 4,180,502 | 12/1979 | Kaufmann | 534/698 X |
| 4,396,544 | 8/1983 | Dore | 534/602 X |

FOREIGN PATENT DOCUMENTS

| | | | |
|---|---|---|---|
| 157733 | 10/1985 | European Pat. Off. | 534/602 |
| 241414 | 10/1987 | European Pat. Off. | 534/602 |
| 493895 | 3/1930 | Fed. Rep. of Germany | 534/602 |
| 61-254550 | 11/1986 | Japan | 534/602 |
| 648364 | 1/1951 | United Kingdom | 534/602 |

OTHER PUBLICATIONS

Colorante Azoici, Editura Tehnica Bucuresti, 330–331.

*Primary Examiner*—Floyd D. Higel
*Assistant Examiner*—Fiona T. Powers
*Attorney, Agent, or Firm*—Kevin T. Mansfield; Edward McC. Roberts

[57] ABSTRACT

The invention relates to a process for the preparation of 1:2 metal complex azo dyes of formula

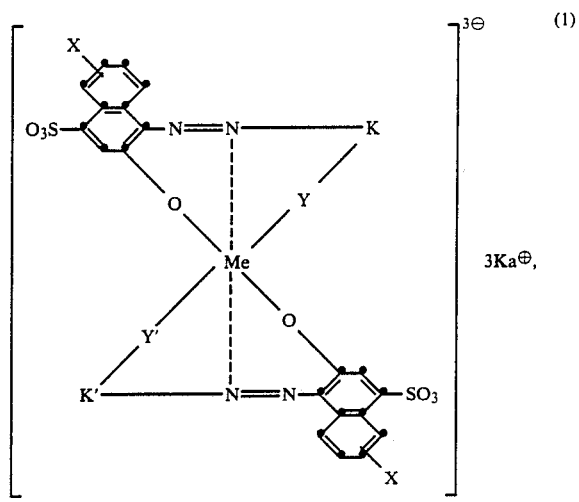

wherein each X is hydrogen, halogen or nitro, K and K' are each independently of the other the radical of a coupling component of the benzene, naphthalene or pyrazolone series, Y and Y' are each —O— or —N(R), wherein R is hydrogen, $C_1$–$C_4$alkyl or phenyl, Me is chromium or cobalt and Ka is a cation, and Y and Y' are attached to K and K' adjacent to the azo group, by coupling and metallising, which process comprises coupling, in aqueous solution, a diazo component of formula

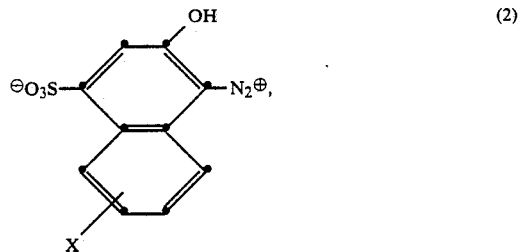

wherein X is as defined for formula (1), in the presence of the 5- to 30-fold molar amount of sodium and/or potassium chloride, based on the molar amount of diazo component, and in the presence of a compound that donates a chromium or cobalt atom, to coupling components of formulae HK—YH and HK'—Y'H     (3), wherein K, K', Y and Y' are as defined for formula (1).

The dyes obtained by the process of this invention are particularly suitable for dyeing wool or synthetic textile polyamide materials as well as leather.

22 Claims, No Drawings

PREPARATION OF 1:2 METAL COMPLEX DYES BY COUPLING IN THE PRESENCE OF A METAL DONOR IN AN INERT GAS ATMOSPHERE

The coupling of 1-diazo-2-hydroxynaphthalene-4-sulfonic acid, or of the corresponding component containing a nitro group, to a coupling component of the benzene, naphthalene or pyrazolone series which contains a hydroxy or amino group adjacent to the coupling component, and the subsequent metallising, proceeds in some cases slowly and in unsatisfactory yield.

In recent years, increasing efforts have been made to automate and optimise processes for the preparation of dyes or their intermediates, both as regards the synthesis and the working up. To obtain satisfactory results, the dye manufacturer is dependent on processes to which the following criteria apply: as quantitative a yield as possible, reproducibly good quality, reactions with as few working up steps as possible, and fast reactions that permit a high number of reactions per unit of time.

It has now been found that these objectives can be achieved by means of the process of this invention.

The process of the present invention for the preparation of 1:2 metal complex azo dyes of formula

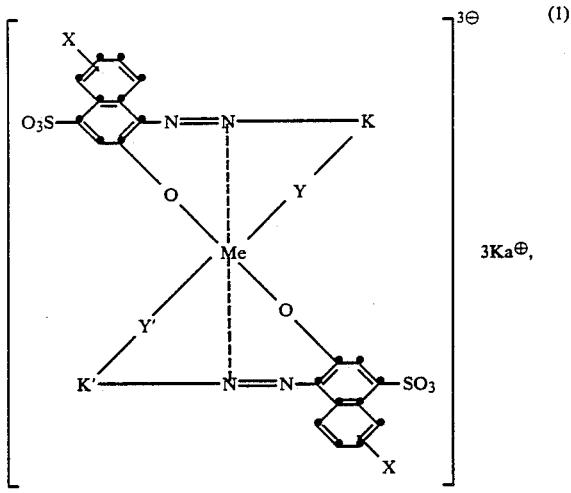

wherein each X is hydrogen, halogen or nitro, K and K' are each independently of the other the radical of a coupling component of the benzene, naphthalene or pyrazolone series, Y and Y' are each —O— or —N(-R)—, wherein R is hydrogen, $C_1$–$C_4$alkyl or phenyl, Me is chromium or cobalt and Ka is a cation, and Y and Y' are attached to K and K' adjacent to the azo group, by coupling and metallising, comprising coupling, in aqueous solution, a diazo component of formula

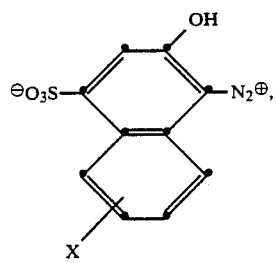

wherein X is as defined for formula (1), in the presence of the 5- to 30-fold molar amount of sodium and/or potassium chloride, based on the molar amount of diazo component, and in the presence of a compound that donates a chromium or cobalt atom, to coupling components of formulae $$HK-YH \text{ and } HK'-Y'H \quad (3),$$

wherein K, K', Y and Y' are as defined for formula (1).

Coupling compounds of formula (2) to compounds of formula (3) is known to be difficult. Attempts have therefore been made to improve the yield by using different catalysts, for example in the presence of zinc salts or in the presence of calcium or magnesium salts, or by coupling under nitrogen. Zinc salts improve the yield, as do also calcium and magnesium salts. A drawback is the troublesome salt content after completion of the reaction, which normally makes it necessary to effect intermediate precipitation of the azo dye.

The method conventionally employed hitherto for obtaining symmetrical 1:2 metal complex azo dyes which contain, per metal atom, two identical azo ligands, or mixed 1:2 metal complex azo dyes which consist of at least two symmetrical complexes and at least one asymmetrical complex, comprises, for example, the following steps:

diazotising at low temperaturea an amine which contains a group suitable for metal complex formation;

coupling the diazonium salt, normally at low temperature, to a coupling component which contains a group suitable for metal complex formation;

isolating the coupling product by salting out and filtration;

dissolving or suspending the coupling product;

metallising the coupling product; and isolating the 1:2 metal complex azo dye.

The shortcomings of this procedure are, for example, the following time-consuming and expensive steps:

isolating the coupling product, for example by salting out and filtration;

dissolving the coupling product again, if necessary or desired with heating for the metallising step.

Also known are processes for the preparation of symmetrical or mixed 1:2 metal complex azo dyes, without intermediate isolation of the coupling product, by carrying out the coupling reaction and the metallising in organic solvents, especially aqueous organic, water-miscible solvents.

The drawback of this process is the necessity of removing the organic solvent and the complicated separation of dye, water and organic solvent.

An additional drawback of this known process is the greater wastewater pollution compared with the purely aqueous procedure.

It is surprising that the process of this invention affords a marked increase in yield by carrying out the coupling in the presence of sodium and/or potassium chloride and of the metal donor, that the azo dye formed as intermediate, without being isolated from the reaction mixture, gives the 1:2 metal complex direct, and that the reaction is almost fully complete after a very short time.

In the process of this invention, it is surprising that the troublesome intermediate isolation of the coupling product can be dispensed with;

coupling and metallising are carried out utilising a single vessel for both steps;

the reaction time is shortened by a higher coupling temperature and immediate metallising is possible;

the reactions are carried out in concentrated solution.

Sensitive azo compounds can also be obtained in good yield and purity by the process of this invention, as the azo intermediate can be stabilised even in the acid pH range directly after coupling by forming a complex with the metal present in the reaction mass.

A preferred embodiment of the process of the invention comprises carrying out coupling and metallising in an inert gas atmosphere, preferably under nitrogen, both steps being carried out in a closed reaction vessel.

The coupling of the diazo component of formula (2) to at least one coupling component of formula (3) is carried out normally in the temperature range above 0° C., for example in the range from 0° to 100° C., preferably from 20° to 70° C. and, most preferably, from 35° to 50° C. In particular, the coupling is carried out adiabatically, an initial temperature of at least 35° C. being especially advantageous.

Coupling reactions can be carried out in the acid and in the alkaline pH range. In the process of this invention, it has proved particularly convenient to carry out the coupling in the alkaline pH range. In general, a pH range of 9 to 11, more particularly from 9.5 to 10.5, is preferred.

In the process of this invention, the coupling is preferably carried out in the presence of the 5- to 10-fold molar amount, preferably the 6- to 8-fold molar amount, of sodium and/or potassium chloride.

Metallising is normally carried out in the temperature range from 40° to 160° C., preferably from 70° to 130° C. In the temperature range above 100° C., metallising is carried out in a closed vessel under pressure (excess pressure), in which case the pressure is conveniently 1 to 6 bar, preferably 2 to 4 bar.

The molar ratio of the diazo component of formula (2) to the coupling component of formula (3) or to the sum of the coupling components of formula (3) is 0.8:1.2 to 1.2:0.8 preferably from 0.95:1.05 to 1.05:0.95.

The process of this invention will preferably be carried out in the absence of sulfate.

It is possible to obtain 1:1 metal complex azo dyes by using suitably higher concentrations of metal salt and lowering the pH value to 0–2.5 after the synthesis of the 1:2 metal complex azo dyes.

The diazo components of formula (2) which can be used in the process of this invention are preferably 1-diazo-2-hydroxynaphthalene-4-sulfonic acid and 1-diazo-6-nitro-2-hydroxynaphthalene-4-sulfonic acid. The diazo components of formula (2) are known and are prepared by known methods.

The coupling components of formula (3) are known and are prepared by known methods. The coupling components used in the process of this invention are those of the benzene, naphthalene or pyrazolone series.

Aside from the hydroxy group, the coupling components of formula (3) can also be substituted by the following substituents: $C_1$–$C_6$alkyl, $C_1$–$C_6$alkoxy, $C_2$–$C_6$alkanoylamino, $C_2$–$C_6$alkanoyl, $C_1$–$C_6$alkoxycarbonylamino, phenyl, halogen, hydroxy, sulfo, sulfonamide and sulfone groups.

$C_2$–$C_6$Alkanoylamino may suitably be acetylamino, propionylamino or butyrylamino.

$C_2$–$C_6$Alkanoyl may suitably be acetyl, propynyl or butyryl.

$C_1$–$C_6$Alkoxycarbonylamino may suitably be methoxycarbonylamino or ethoxycarbonylamino.

$C_1$–$C_6$Alkyl is typically methyl, ethyl, propyl, isopropyl, butyl, sec-butyl, tert-butyl, isobutyl, pentyl or hexyl.

$C_1$–$C_6$Alkoxy is typically methoxy, ethoxy, propoxy, isopropoxy or butoxy.

Halogen is suitably fluoro, bromo or, preferably, chloro.

Sulfonamido is, for example, —$SO_2NH_2$, $SO_2NH$—$C_1$–$C_6$alkyl, for example —$SO_2NHCH_3$, or —$SO_2NHC_2H_5$ and —$SO_2N(C_1$–$C_6$alkyl$)_2$, for example —$SO_2N(CH_3)_2$ and $SO_2N(C_2H_5)_2$ as well as

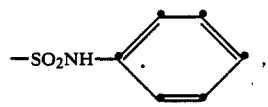

in which the phenyl nucleus can be substituted, for example by sulfo or carboxy.

Sulfone groups are, for example, —$SO_2$—$C_1$–$C_6$alkyl such as —$SO_2$—$CH_3$ and —$SO_2$-aryl such as phenylsulfonyl.

A preferred embodiment of the process of this invention comprises the use of coupling components of formula (3), wherein at least one of K and K' is a radical of the benzene or naphthalene series or is a 1-phenyl-3-methylpyrazol-5-one radical, which radicals may carry one to three of the above substituents. K is preferably the naphthyl radical.

Particularly suitable coupling components are phenols which are substituted by $C_1$–$C_6$alkyl and/or $C_1$–$C_6$alkanoylamino, $C_2$–$C_6$alkanoyl, $C_1$–$C_6$alkoxycarbonylamino and hydroxy, and, in particular, naphthols which are unsubstituted or substituted by chloro, $C_2$–$C_6$alkanoylamino, $C_1$–$C_6$alkoxycarbonylamino, sulfo, sulfonamide or sulfone groups, for example 4-methylphenol, 4-tert-butylphenol, 2,4-dimethylphenol, 2-acetylamino-4-methylphenol, resorcinol, 4-acetylresorcinol, 1- or 2-naphthol, 1-naphthol-3-, -4- or -5-sulfonic acid, 2-naphthol-3-, -4-, -5-, -6-, -7- or -8-sulfonic acid, 2-naphthol-6-sulfamide, 1-acetylamino-7-naphthol, 1-acetylamino-6-naphthol, 1-propionylamino-7-naphthol and 1-carbomethoxyamino-7-naphthol. A suitable coupling component of the pyrazolone series is, for example, 1-phenyl-3-methylpyrazol-5-one.

In a particularly preferred embodiment of the process of this invention, K and K' and Y and Y' have identical meanings, so that symmetrical metal complexes are formed.

In a more particularly preferred embodiment of the process of this invention, the coupling component of formula (3) is resorcinol, 1-phenyl-3-methyl-5-pyrazolone or 1- or 2-naphthol, or 2-naphthylamine, which coupling components may be substituted by halogen, $C_1$–$C_4$alkyl, sulfamoyl, $C_2$–$C_5$alkanoylamino, $C_2$–$C_5$alkanoyl, $C_2$–$C_5$alkoxycarbonylamino, $C_1$–$C_4$alkoxy, sulfo, hydroxy or phenyl.

Interesting dyes are obtained by using 2-naphthol or 1-phenyl-3-methyl-5-pyrazolone, preferably 2-naphthol, as coupling component of formula (3).

A particularly interesting embodiment of the process of the invention comprises using a diazo component of formula (2), wherein X is nitro or hydrogen, preferably nitro.

A very particularly interesting embodiment of the process of this invention comprises coupling a diazo component of formula

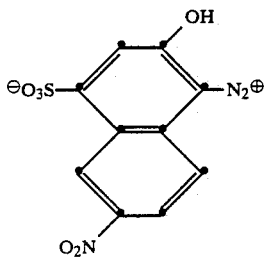

(4)

in the presence of the 5- to 10-fold amount of sodium chloride and in the presence of sodium chromate salicylayte, to 2-naphthol.

Examples of suitable chromium or cobalt donors are the customary salts or complex compounds of these metals, for example chromium(III) chloride, chromium(III) fluoride, chromium(III) acetate, $Cr(OH)SO_4$, chromium(III) formate, chromium tartrate, cobalt(II) sulfate, cobalt(II) acetate, cobalt tartrate, freshly precipitated cobalt(II) hydroxide, as well as complex chromium compounds, aliphatic dicarboxylic acids, hydroxycarboxylic acids or aromatic hydroxycarboxylic acids, for example sodium chromate salicylate.

An important embodiment of the process of this invention comprises carrying out the coupling in the presence of a compound that donates a chromium or cobalt atom, preferably in the presence of a compound that donates a chromium atom.

In the process of this invention, the molar ratio of diazo component to coupling component or to the sum of all coupling components is preferably 0.9:1.0 to 1.1:1.0.

The molar ratio of the diazo component or the sum of the coupling components to the metallising agent is preferably 1.7:1.0 to 2.3:1.0, most preferably 1.9:1.0 to 2,1:1, in the process of this invention.

In general, a molar excess of metallising agent of 1 to 15 percent has proved useful in the process of this invention.

The dyes obtained by the process of the invention are either in the form of the free acid or, preferably, of salts thereof. Examples of suitable salts are the alkali metal salts, alkaline earth metal salts or ammonium salts or the salts of an organic amine. Typical examples of such salts are the sodium, lithium, potassium or ammonium salts or the salt of triethanolamine.

The dyes of this invention can be isolated by mwethods which are known per se and processed to useful dry dye formulations. Isolation is preferably effected at low temperature by salting out and filtration, or by reverse osmosis or ultrafiltration. The filtered dyes can be dried, if desired after the addition of reducing agents and/or buffers, e.g. after the addition of a mixture of identical parts of mono- or disodium phosphate. Drying is preferably carried out at not too elevated temperature and under reduced pressure. By spray drying the entire reaction mixture it is possible in certain cases to obtain the dry formulations direct, i.e. without intermediate isolation of the dyes. In addition, the reaction solution containing the dyes, with the optional addition of conventional auxiliaries, can be used as liquid formulation, or the isolated dyes can be processed in conventional manner to liquid formulations.

The 1:2 metal complex azo dyes obtained by the process of this invention are suitable for dyeing and printing a wide range of materials, such as wood or cellulose, but especially for dyeing animal fibres such as silk, leather and, preferably, wool, and also for dyeing synthetic fibres made from polyamides (especially polyamide 6 and polyamide 66), polyurethanes or polyacrylonitrile. They are particularly suitable for dyeing from a weakly alkaline, neutral or weakly acid bath containing preferably acetic acid. The dyeings so obtained are level, very brilliant and have good all-round fastness properties, in particular good light- and wetfastness.

The above textile materials can be in a wide range of presentation, for example as fibres, yarn, woven or knitted goods.

In the following Examples, parts are by weight. The relationship between parts by weight and parts by volume is the same as that between grams and cubic centimeters.

EXAMPLE 1

60 parts of water are charged to a reactor under nitrogen, and then 39.8 parts of 1-diazo-6-nitro-2-hydroxynaphthalene-4-sulfonic acid are added. to the well stirred yellow suspension are then added 50 parts of ice. The temperature is 0° C. Thereafter the pH is adjusted to 2.5 by addition of 33.2 parts of a 30% aqueous solution of sodium hydroxide, whereupon the temperature rises to ca. 20° C. The pH is adjusted to 8 with 30% aqueous sodium hydroxide solution, then 156.3 parts of a solution of sodium chromate salicylate containing 3.5 parts of chromium are added, followed by the addition of 60 parts of sodium chloride (or 70 parts of potassium chloride). A solution of 50 parts of water, 21.5 parts of 2-naphthol and 18.6 parts of a 30% aqueous solution of sodium hydroxide is then added dropwise over 1 hour at a temperature of 20°–40° C., such that the pH does not exceed 10. When this addition is complete, the temperature is ca. 40° C. The reaction mixture is stirred for a further hour at pH 10 and 40° C. until no more 1-diazo-6-nitro-2-hydroxynaphthalene-4-sulfonic acid is detectable. The reaction mixture is then heated to reflux temperature and kept thereat until metallisation is complete. The pH is 10. The nitrogen blanketing is discontinued, the suspension is adjusted to pH 9 with 32% aqueous hydrochloric acid, and ca. 80 parts of ice are added. At a maximum temperature of 70° C., 60 parts of potassium chloride are added and the batch is stirred for 30 minutes, then another 60 parts of potassium chloride are added and stirring is continued for a further 30 minutes. A dense precipitation of the dye forms. The precipitate is isolated by filtration and the resultant dye of formula

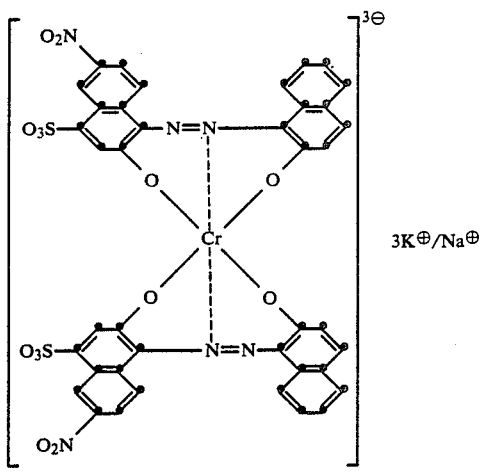

is dried at 70° C. under vacuum. It dyes wool and leather in a black shade. Salting out with an equimolar amount of sodium chloride or sodium sulfate or a mixture of salts gives the sodium salt or a mixture of the sodium and potassium salt of the indicated dye.

EXAMPLE 2

The procedure of Example 1 is repeated, using 100 parts of sodium chloride (or 150 parts of potassium chloride) instead of 60 parts of sodium chloride (or 70 parts of potassium chloride), and salting out the dye with 30 parts of potassium chloride. The same dye having the same good properties is obtained.

EXAMPLE 3

The procedure of Example 1 is repeated, using 45 parts of sodium chloride (or 55 parts of potassium chloride) instead of 60 parts of sodium chloride (or 70 parts of potassium chloride), and salting out the dye with 80 parts of potassium chloride. The same dye having the same good properties is obtained.

EXAMPLE 4

The procedure of Example 1 is repeated, adding 360 parts, instead of 60 parts, of water to the solution of the diazo compound and using 220 parts of sodium chloride (or 280 parts of potassium chloride) instead of 60 parts of sodium chloride (or 70 parts of potassium chloride), and salting out the dye with 100 parts of potassium chloride. The same dye having the same good properties is obtained.

EXAMPLES 5 AND 6

The procedure of Example 1 is repeated, replacing 39.8 parts of 1-diazo-6-nitro-2-hydroxynaphthalene-4-sulfonic acid by an equimolar amount of the diazo component indicated in column 2 of Table 1 in the form of the free acid, and replacing 21.5 parts of 2-naphthol by an equimolar amount of the coupling component indicated in column 3. The corresponding dyes so obtained dye wool and leather in the shades indicated in column 4 of the Table.

TABLE 1

| Ex. | Diazo component | Coupling component | Shade on wool and leather |
|---|---|---|---|
| 5 | (structure) | (structure) | claret |
| 6 | (structure) | (structure) | navy blue |

EXAMPLE 7

The procedure of Example 7 is repeated, replacing the solution of sodium chromate salicylate by an equimolar amount of cobalt tartrate solution. The corresponding cobalt complex so obtained dyes wool and leather in a corinth shade.

The same procedure in Example 5 gives a reddish brown shade, and in Example 6 a violet shade, on wool and leather.

What is claimed is:

1. A process for the preparation of a 1:2 metal complex azo dye of the formula

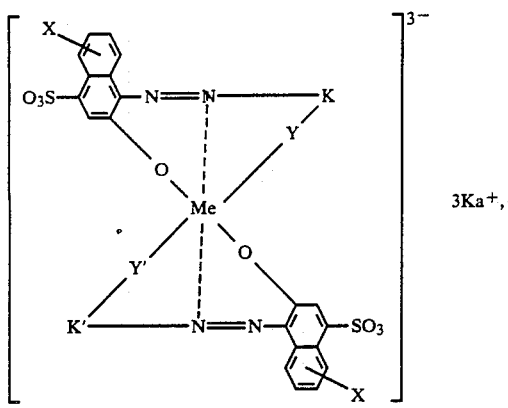

wherein each X is hydrogen, halogen or nitro, K and K' are each independently of the other a benzene, naphthalene or pyrazolone coupling component, which is unsubstituted or substituted by $C_1$–$C_6$alkyl, $C_1$–$C_6$alkoxy, $C_2$–$C_6$alkanoylamino, $C_2$–$C_6$alkanoyl, $C_1$–$C_6$alkoxycarbonylamino, phenyl, halogen, hydroxy, sulfo, —$SO_2NH_2$, —$SO_2NH$—$C_1$–$C_6$alkyl, —$SO_2N(C_1$–$C_6$alkyl$)_2$, phenylaminosulfonyl, which is unsubstituted or substituted in the phenyl nucleus by sulfo or carboxy, $SO_2$—$C_1$–$C_6$alkyl or phenylsulfonyl, Y and Y' are each —O— or —N(R), wherein R is hydrogen, $C_1$–$C_4$alkyl or phenyl, Me is chromium or cobalt and Ka is a cation, and Y and Y' are attached to K and K' adjacent to the azo group, by coupling and metallizing, which process comprises coupling in an inert gas atmosphere, in aqueous solution, a diazo component of formula

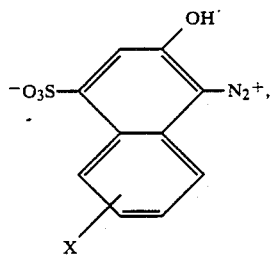

wherein X is as defined for formula (1), in the presence of the 5- to 30-fold molar amount of sodium chloride and/or potassium chloride, based on the molar amount of diazo component, and in the presence of a compound that donates a chromium or cobalt atom, to coupling components of formulae

 (3), wherein K', Y and Y' are as defined for formula (1).

2. A process according to claim 1, wherein coupling and metallising are carried out under nitrogen.

3. A process according to claim 1, wherein coupling is carried out in the temperature range from 5° to 100° C.

4. A process according to claim 3, wherein coupling is carried out in the temperature range from 35° to 50° C..

5. A process according to claim 1, wherein coupling is carried out in the pH range from 9 to 11.

6. A process according to claim 5, wherein coupling is carried out in the pH range from 9.5 to 10.5.

7. A process according to claim 1, wherein metallising is carried out in the temperature range from 40° to 160° C.

8. A process according to claim 7, wherein metallising is carried out in the temperature range from 70° to 130° C.

9. A process according to claim 1, wherein metallising is carried out under a pressure of 1 to 6 bar.

10. A process according to claim 9, wherein metallising is carried out under a pressure of 2 to 4 bar.

11. A process according to claim 1, wherein a coupling component of formula (3) is used, in which K and K' and Y and Y' have identical meanings.

12. A process according to claim 1, wherein the coupling component of formula (3), or mixture of coupling components of formula (3), is resorcinol, 1-phenyl-3-methyl-5-pyrazolone or 1- or 2-naphthol, or 2-naphthylamine, which coupling components may be substituted by halogen, $C_1$–$C_6$alkyl, sulfamoyl, $C_2$–$C_6$alkanoylamino, $C_2$–$C_6$alkanoyl, $C_2$–$C_6$alkoxycarbonylamino, $C_1$–$C_4$alkoxy, sulfo, hydroxy or phenyl.

13. A process according to claim 1, wherein the coupling component of formula (3) is 2-naphthol or 1-phenyl-3-methyl-5-pyrazolone.

14. A process according to claim 13, wherein the coupling component of formula (3) is 2-naphthol.

15. A process according to claim 1, wherein the diazo component of formula (2) is used, in which X is nitro or hydrogen.

16. A process according to claim 15, wherein a diazo component of formula (2) is used, in which X is nitro.

17. A process according to claim 1, wherein coupling and metallising are carried out in the presence of a compound that donates a chromium atom.

18. A process according to claim 1, wherein the molar ratio of the diazo component of formula (2) to the coupling component of the formula (3), or to the sum of the coupling components of formula (3), is 0.9:1.0 to 1.1:1.0.

19. A process according to claim 1, wherein the molar ratio of the diazo component of formula (2), or of the sum of the coupling components of formula (3), to the metallising agent is 1.7:1.0 to 2.3:1.0.

20. A process according to claim 1, wherein the metal donor is used in a molar excess of 1 to 15 percent.

21. A process according to claim 1, wherein the coupling is carried out in the presence of the 5-to 10-fold molar amount of sodium chloride and/or potassium chloride.

22. A process according to claim 21, wherein the coupling is carried out in the presence of the 6-to 8-fold molar amount of sodium chloride and/or potassium chloride.

* * * * *